United States Patent
Miller et al.

(10) Patent No.: US 11,062,292 B2
(45) Date of Patent: Jul. 13, 2021

(54) SYSTEMS AND METHODS FOR PAYMENT COLLECTION FROM THIRD PARTY SOURCE

(71) Applicant: Capital One Services, LLC, McLean, VA (US)

(72) Inventors: Walter Avery Miller, Glen Allen, VA (US); Jason E. Ferrell, Glen Allen, VA (US); Troy Alan Dye, Richmond, VA (US); Robert A. Martin, Glen Allen, VA (US); Jordan Fischer, Evanston, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/681,776

(22) Filed: Nov. 12, 2019

(65) Prior Publication Data
US 2020/0265421 A1    Aug. 20, 2020

Related U.S. Application Data

(60) Provisional application No. 62/808,092, filed on Feb. 20, 2019.

(51) Int. Cl.
*G06Q 20/22* (2012.01)
*G06Q 20/40* (2012.01)
(Continued)

(52) U.S. Cl.
CPC ....... *G06Q 20/223* (2013.01); *G06F 16/2379* (2019.01); *G06N 20/00* (2019.01); *G06Q 20/108* (2013.01); *G06Q 20/34* (2013.01); *G06Q 20/3674* (2013.01); *G06Q 20/3676* (2013.01); *G06Q 20/382* (2013.01); *G06Q 20/405* (2013.01); *G06Q 20/42* (2013.01); *G06Q 30/0215* (2013.01); *G06Q 30/0233* (2013.01); *G06Q 30/0236* (2013.01);
(Continued)

(58) Field of Classification Search
CPC .. G06Q 20/3676; G06Q 20/223; G06N 20/00; H04L 9/0637
See application file for complete search history.

(56) References Cited

U.S. PATENT DOCUMENTS 8,700,526 B1 *  4/2014  Cozens ............. G06Q 20/3224
                                                            705/39
9,853,977 B1 * 12/2017  Laucius ............. H04L 63/0807
(Continued)

*Primary Examiner* — Zeshan Qayyum
*Assistant Examiner* — Vincent I Idiake
(74) *Attorney, Agent, or Firm* — Finnegan, Henderson, Farabow, Garrett & Dunner, LLP

(57) ABSTRACT

Systems and methods for P2P transaction functionality include payment collection from a third party source. A system includes at least one processor and a storage medium storing instructions that, when executed by the one or more processors, cause the at least one processor to perform operations including receiving transaction information from a vendor where a card was used and analyzing the transaction information. The operations also include sending one or more requests for repayment to one or more P2P service systems, receiving repayment information, regarding one or more repayments, from the one or more P2P service systems and, based on the repayment information, applying the one or more repayments to the transaction performed on the card.

16 Claims, 9 Drawing Sheets

Transaction and request event

(51) Int. Cl.
  *G06Q 20/38*   (2012.01)
  *H04L 29/06*   (2006.01)
  *H04L 9/06*    (2006.01)
  *G06Q 20/42*   (2012.01)
  *G06Q 20/10*   (2012.01)
  *G06Q 20/36*   (2012.01)
  *G06Q 30/02*   (2012.01)
  *G06Q 40/02*   (2012.01)
  *G06Q 50/00*   (2012.01)
  *G06N 20/00*   (2019.01)
  *G06F 16/23*   (2019.01)
  *G06Q 20/34*   (2012.01)

(52) U.S. Cl.
  CPC .............. *G06Q 40/02* (2013.01); *G06Q 50/01* (2013.01); *H04L 9/0637* (2013.01); *H04L 63/0853* (2013.01); *G06Q 2220/00* (2013.01)

(56) References Cited

U.S. PATENT DOCUMENTS

2013/0346302 A1\* 12/2013 Purves .................. G06Q 30/04
                                                  705/40
2015/0278947 A1\* 10/2015 Don ....................... G06Q 20/12
                                                  705/38
2017/0099294 A1\*  4/2017 Roberts .................. G06F 16/25
2019/0130399 A1\*  5/2019 Wright ............... G06Q 20/3678
2019/0303928 A1\* 10/2019 Kaladgi ............. G06Q 20/3278
2020/0074449 A1\*  3/2020 Novis ................... G06N 20/00

\* cited by examiner

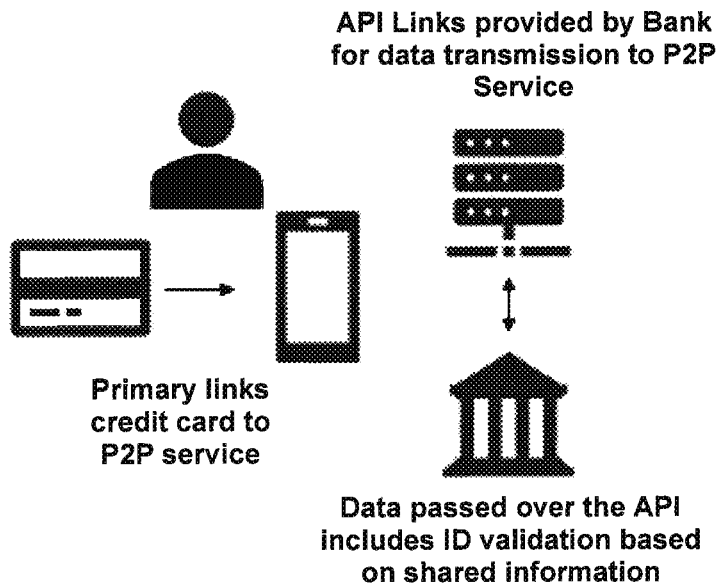
*Fig. 1A Connectivity set up and enablement*
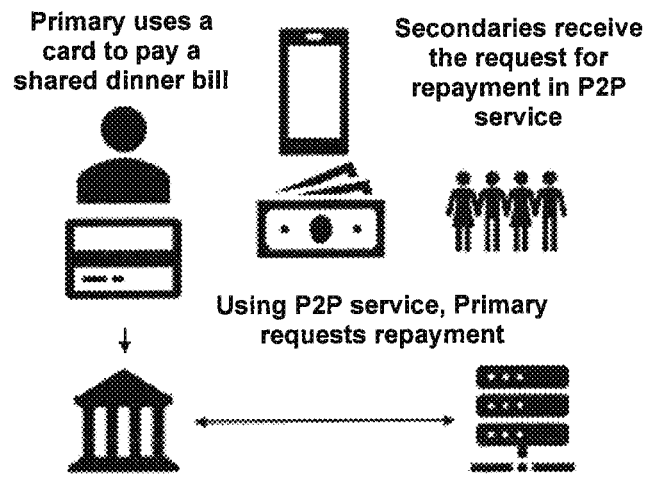
*Fig. 1B Transaction and request event*

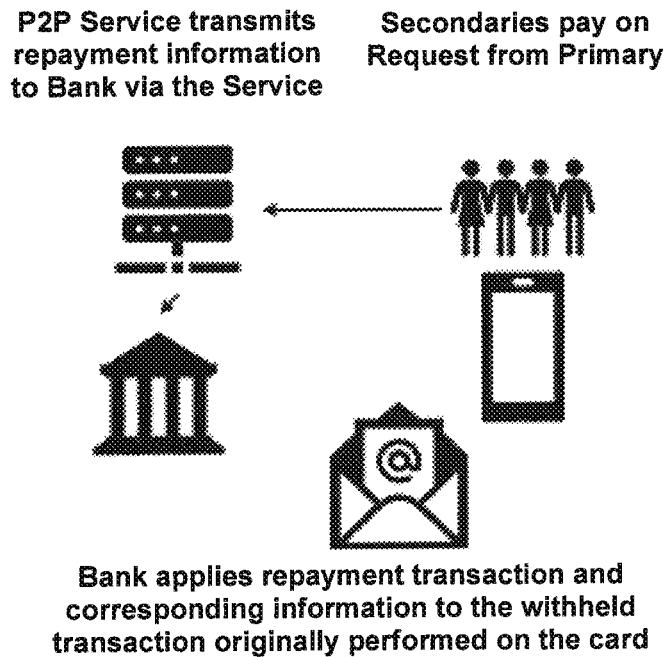
*Fig. 1C Repayment application process*
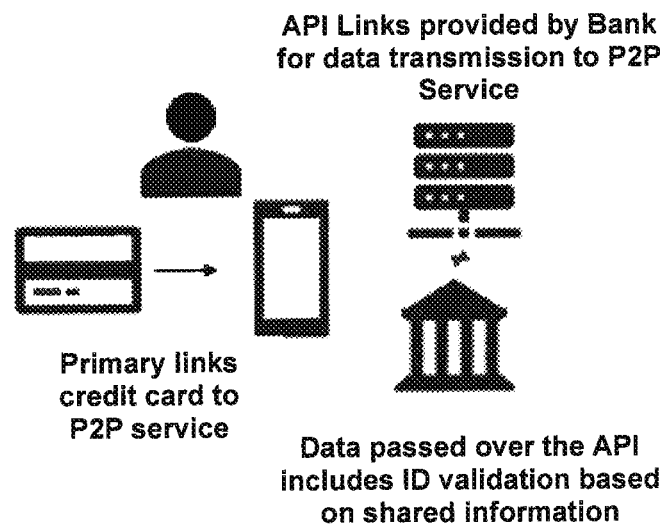
*Fig. 2A Connectivity set up and enablement*

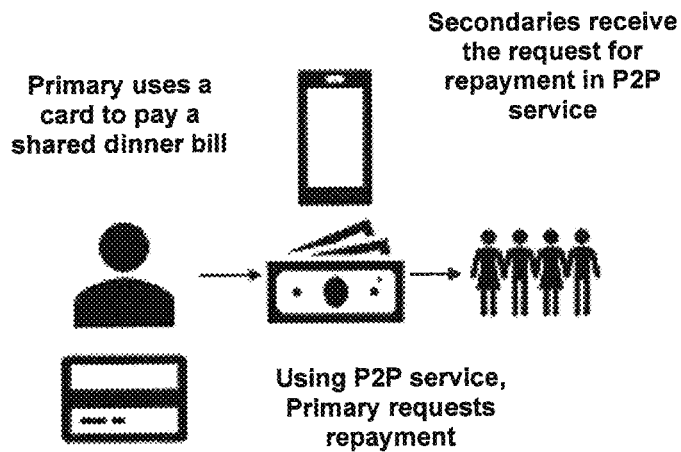
Fig. 2B Transaction and request event
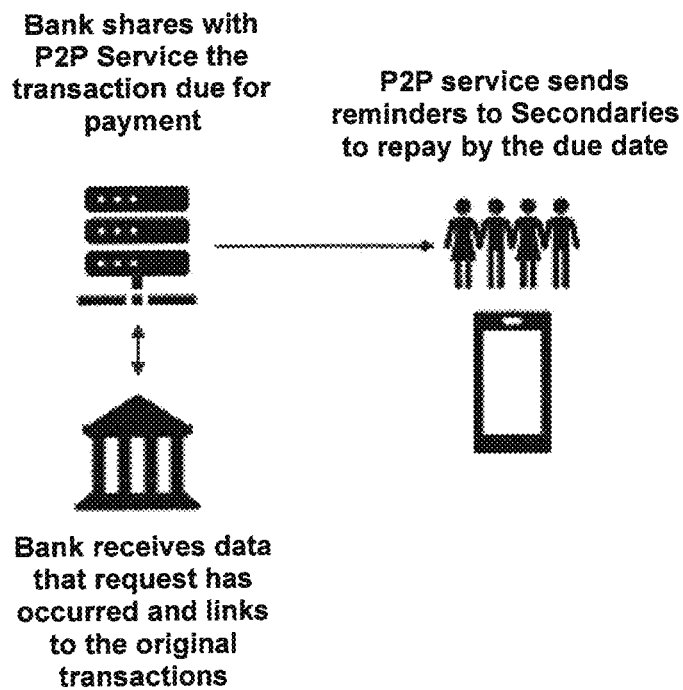
Fig. 2C Repayment enforcement process

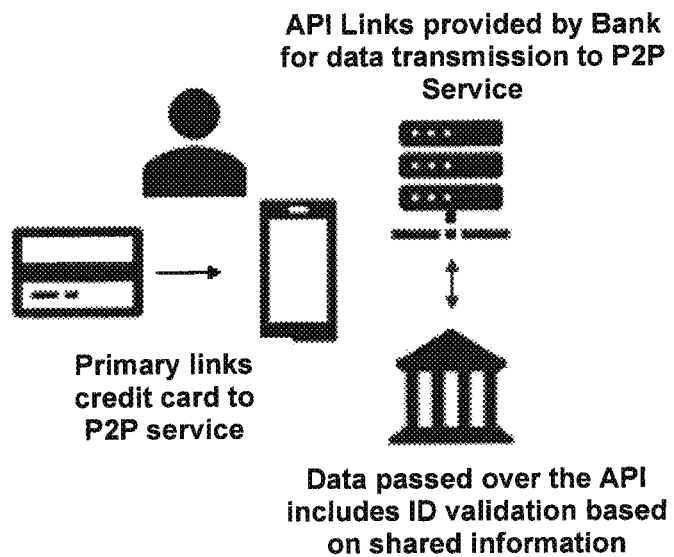
Fig. 3A Connectivity set up and enablement
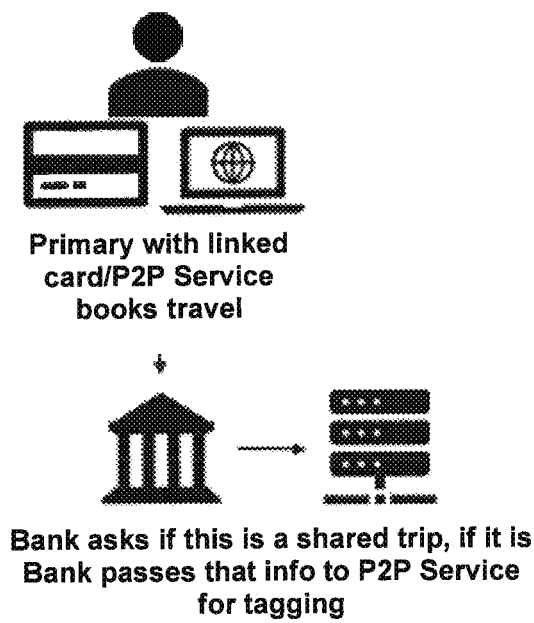
3B Trigger Event for Trip

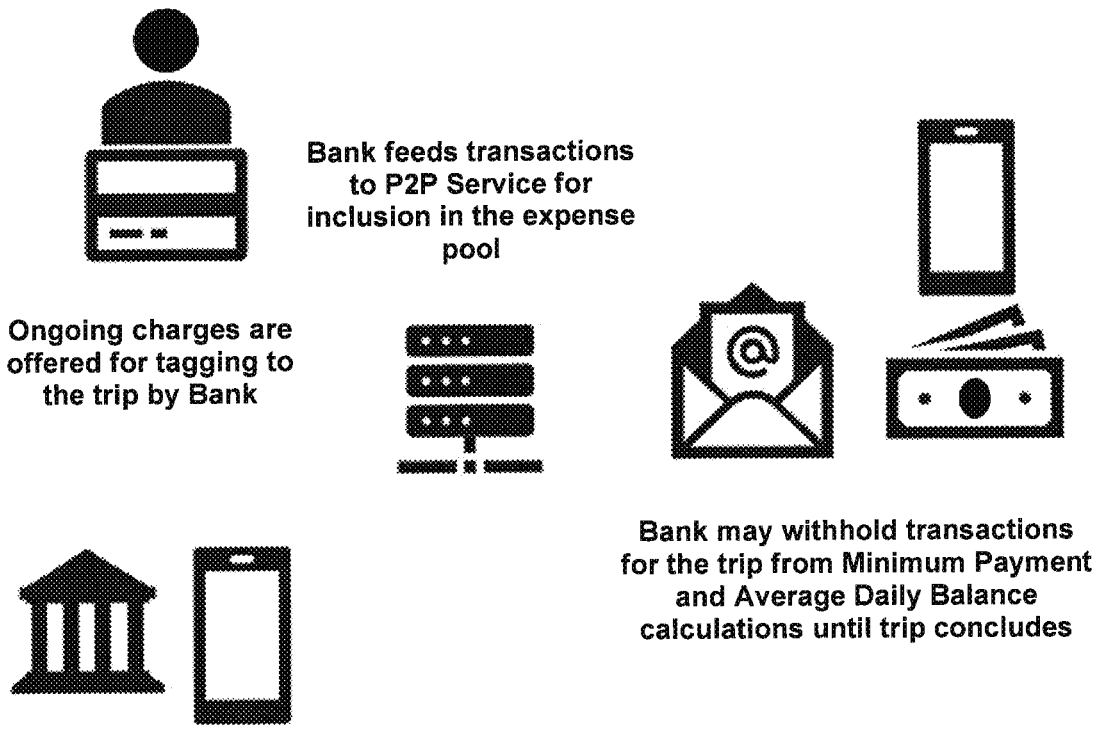
Fig.3C Trip Expense Accrual and Repayment Process
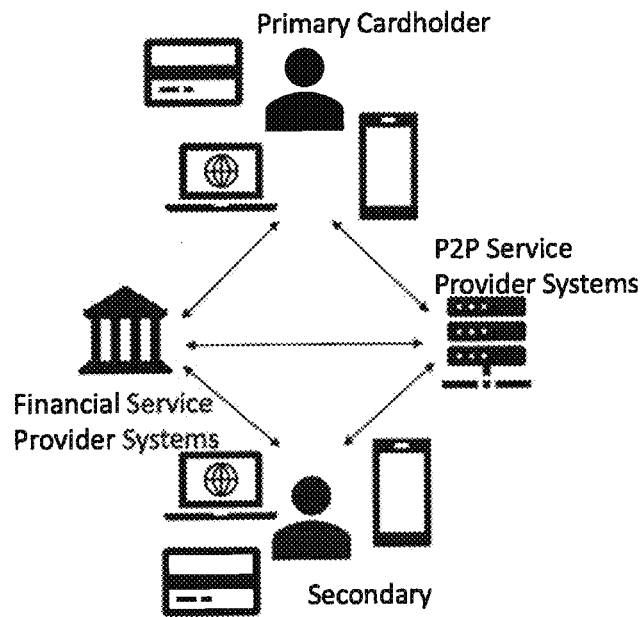
Fig.4A

SYSTEMS AND METHODS FOR PAYMENT COLLECTION FROM THIRD PARTY SOURCE

PRIORITY CLAIM

This application claims priority under 35 U.S.C. § 119 to U.S. Provisional Application No. 62/808,092, filed on Feb. 20, 2019, which is expressly incorporated herein by reference in its entirety.

TECHNICAL FIELD

The disclosed embodiments generally relate to systems and methods for P2P transaction functionality and, more particularly, to payment collection from a third party source.

BACKGROUND

People often use their credit card for transactions involving friends and later get paid back by their friends. The friends may pay back the credit card holder via their social P2P accounts. However, it is sometimes difficult to get those paid back funds from the social P2P accounts applied to the credit card. Currently, the cardholder would need to transfer money from the P2P account to their primary banking account, which may take a long time, and then make a credit card payment from their primary banking account.

Whenever a person tries to split a bill at a restaurant or bar that they pay for with friends, there are many services to make that bill splitting possible: Venmo, Zelle, PayPal, SquareCash, etc. But while the person is waiting to get paid back, they may be assessed interest charges, or worse, be late on making their credit card payment for that transaction.

When a person picks up the tab for friends, it may be difficult to get paid back. Even when the person requests repayment from their friends via P2P service systems, the person may not get paid back promptly. And worse, the person may consider it rude and awkward to keep asking. Further, putting a "request" for repayment out to friends is one thing, while getting paid back is another and continuing to ask can often be awkward.

SUMMARY

Consistent with the present disclosure, there is provided a financial service provider system for obtaining repayment for a transaction. The system includes at least one processor, and a storage medium storing instructions that, when executed by the at least one processor, cause the at least one processor to perform operations that include enrolling a cardholder device in a service; initiating a link with one or more P2P service systems to enable data communication; receiving information about a transaction from a vendor where a card associated with the cardholder device was used; analyzing the transaction information based on at least one of a category, a location, or an amount of the transaction, or a past transaction history associated with the card; sending the transaction information to the cardholder device; and receiving a response from the cardholder device. The operations also include recording that a repayment is expected for the transaction, based on the response received from the cardholder device; querying the cardholder device for additional information based on the recording; receiving the additional information from the cardholder device identifying at least one or more requests for the repayment; confirming the one or more requests for the repayment with the cardholder device; sending the one or more requests for repayment to the one or more P2P service systems; receiving repayment information, regarding one or more repayments, from the one or more P2P service systems; and based on the repayment information, applying the one or more repayments to the transaction performed on the card.

Consistent with the present disclosure, there is also provided a P2P service provider system for obtaining repayment for a transaction. The system includes at least one processor, and a storage medium storing instructions that, when executed by the at least one processor, cause the at least one processor to perform operations that include initiating a link with a financial service provider system to enable data communication; receiving one or more requests for repayment of a transaction from the financial service provider system; identifying secondary users, of the P2P service system, associated with the transaction, based on the received one or more requests for repayment, wherein the secondary users are users other than a cardholder of a card used to pay for the transaction; sending the one or more requests for repayment to the one or more secondary users of the P2P service system; receiving repayment in response to the one or more sent requests for repayment from at least one of the secondary users of the P2P service system; and sending repayment information regarding the repayments from the secondary users, the repayment information including a repayment act, a date of repayment, an amount of repayment, and an identification of the at least one of the secondary users to the financial service provider system.

Consistent with the present disclosure, there is further provided a cardholder system for obtaining repayment for a transaction. The system includes at least one processor, and a storage medium storing instructions that, when executed by the at least one processor, cause the at least one processor to perform operations that include executing an integrated solution to payment collection from a third party source, wherein the integrated solution comprises a P2P application connected via deep-linking to a financial service provider system and a P2P service system; receiving transaction information from the financial service provider system; receiving and displaying a notification to a cardholder of a card, issued by the financial service provider system, that proposes the cardholder tag certain transactions for repayment based on the transaction information received from the financial service provider system. The operations also include receiving input from the cardholder, wherein the input is used for tagging a transaction and identifying which P2P service system to use for the repayment; sharing location services with the financial service provider system for populating required repayment information; and collecting and sending identifying transaction information and repayment options to the financial service provider system.

It is to be understood that both the foregoing general description and the following detailed description are exemplary and explanatory only and are not restrictive of the disclosed embodiments, as claimed. For example, although disclosed embodiments are discussed primarily in the context of P2P systems, other applications are available.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIGS. 1A-1C illustrate aspects of a P2P payment application to a credit card transaction embodiment in which:

FIG. 1A illustrates connectivity setup and enablement of P2P payment application to a specific credit card transaction embodiment. A cardholder ("Primary") links a credit card from a financial service provider system (Bank C) to a P2P service system A. API links provided by the financial service provider system (Bank C) allow for data transmission to the P2P service system A's server instances. Data passed over the API includes ID validation based on public and private shared information, transaction data, balance data, due date, and repayment data;

FIG. 1B illustrates a transaction and request event of payment application to a specific credit card transaction. The cardholder (Primary) uses a credit card to pay a dinner bill with friends. Using P2P service system A, Primary requests the financial service provider system (Bank C) for repayment from the friends ("Secondaries"). Bank C shares transaction data with P2P service system A and service A shares back there is a request for repayment in place. Secondaries receive the request for repayment in their digital experiences for P2P service system A. Bank C holds that transaction aside from Primary's ADB (average daily balance) and interest application until repayment; and FIG. 1C illustrates a repayment application process event of payment application to the specific credit card transaction. Wherein, the Secondaries (friends) pay on request from the Primary (cardholder) in P2P service system A. P2P service system A transmits the repayment act, date, and amount, and sender to Bank C via the Service. Bank C applies a repayment transaction received via a social payment repayment service, here P2P service system A, to the withheld transaction originally performed on the card. Bank C also applies the transaction and repayment information from P2P service system A to Primary's statement.

FIGS. 2A-2C illustrate aspects of providing social payment pressure for a transaction splitting repayment embodiment in which:

FIG. 2A illustrates connectivity set up and enablement for social payment pressure for a transaction splitting repayment process embodiment. Primary (cardholder) links a credit card from the financial service provider (Bank C) to P2P service system A via a service for application of P2P payment to a credit card transaction. API links provided by the financial service provider system (Bank C) allow for data transmission to P2P service system A's server instances. Data passed over the API includes ID validation based on public and private shared information, transaction data, balance data, due date, and repayment data;

FIG. 2B illustrates a transaction and request event for the social payment pressure for the transaction splitting repayment process. Primary (cardholder) uses the linked credit card to pay a dinner bill with friends (Secondaries). Using P2P service system A, Primary requests repayment from Secondaries. Secondaries receive the request for repayment in their digital experiences for P2P service system A; and FIG. 2C illustrates a repayment enforcement process for the social payment pressure for the transaction splitting repayment process embodiment. Bank C shares with P2P service system A when the transaction is coming due for payment. P2P service system A sends reminders to Secondaries to repay Primary before the transaction hits a due date. Bank C receives data indicating that the request for repayment has occurred and relates that to the original transaction.

FIGS. 3A-3C illustrate aspects of a social trip management and planning embodiment in which:

FIG. 3A illustrates connectivity set up and enablement of a social trip management and planning embodiment. Primary (cardholder) links a credit card from the financial service provider system (Bank C) to P2P service system A via a service for social trip management and planning. API links provided by the financial service provider system (Bank C) allow for data transmission to P2P service system A's server instances. Data passed over the API includes ID validation based on public and private shared information, transaction data, balance data, due date, friend data, and repayment data;

FIG. 3B illustrates a Trigger Event for Trip of the social trip management and planning embodiment. Primary (cardholder) with a linked card and P2P service system books travel as an initiation point. Bank C uses digital experiences to ask if this booking is a shared trip. If it is a shared trip, Bank C passes that information to P2P service system A via the service for social trip management and planning for tagging; and FIG. 3C illustrates a Trip Expense Accrual and Repayment Process of the social trip management and planning embodiment. Ongoing charges from the Primary (cardholder) which occur in the trip location are offered to Primary (cardholder) for tagging to the trip by Bank C. Bank C feeds ongoing transactions to P2P service system A to include in the shared trip pool of expenses. Bank C may withhold transactions for the trip from calculations on Minimum Payment and Average Daily Balance until trip concludes and request for repayment are made in P2P service system A.

FIGS. 4A and 4B illustrate exemplary interconnectivity between participating systems, in which:

FIG. 4A illustrates exemplary interconnectivity and network data flow between cardholder devices, financial service provider systems, P2P service systems, and secondary users of P2P service system and/or financial service provider system; and FIG. 4B illustrates exemplary interconnectivity and network data flow between cardholder devices, financial service provider systems, and P2P service system provider systems.

FIGS. 5A and 5B illustrate exemplary networking between participating systems, in which:

FIG. 5A illustrates exemplary network accessed by a cardholder with various cardholder devices utilizing a deep link integrated system of financial service provider and P2P service systems; and FIG. 5B illustrates an exemplary network accessed by a cardholder with various cardholder devices utilizing an API link integrated system of financial service provider and P2P service systems.

FIGS. 7A-7C illustrate exemplary components of participating systems, in which:

FIG. 7A illustrates exemplary components of a financial service provider system including, but not limited to: network devices, processing/computing devices, storage devices, etc.;

FIG. 7B illustrates exemplary components of a cardholder system including, but not limited to: end-user devices, storage devices, I/O devices, networking, and various ways of transactions types utilized by the cardholder etc.; and FIG. 7C illustrates exemplary components of a P2P service system, including but not limited to: network devices, processing/computing devices, storage devices, etc.

FIGS. 9A and 9B illustrate an exemplary transaction and P2P service system transaction unification in a shared data and experience space, in which.

FIG. 9A illustrates an overview of social reporting and attribution of a transaction process, wherein, cardholder, who is also a P2P service system user (shared customer) across entities consents to linking and sharing of specific data elements for specific purposes. P2P service system provides referential data elements, such as "friends", "contacts", "requests", P2P payment history, etc. Financial service provider (Bank/Card Issuer) provides card transaction data elements and interaction schema (notifications/alerts with actions) for authorized and posted transactions, as well as due dates, payments made or scheduled, etc.; and FIG. 9B illustrates a more detailed depiction of social reporting and attribution of a transaction process. A cardholder (Card) transaction initiates the transaction process, the financial service provider (bank) recognizes an authorized transaction and issues a purchase alert. The purchase alert has the option to include a transaction in the P2P service system for social feed, reporting, and tagging friends for requests. The P2P service system receives a transaction record and notes repayment requests to certain friends tagged for their amounts and shares back to this information to the financial service provider system (e.g. Card issuing bank). A sharing process creates a new Containerized Record of the transaction with new data elements about tagged friends, requests, etc. The transaction record does not "close" when posted but rather stays open until all request and payment actions are completed. The financial service provider retains and controls a primary newly created containerized ledger data on total transaction history (card authorization, card final post, payment history on the transaction, requests, request status, etc.). The financial service provider has read/write and access controls to data. The financial service provider "closes" the transaction once all actions necessary are recorded by all parties (financial service provider system and participating P2P service systems). The P2P service system has a "ghost" record of containerized ledger data, and the P2P service system can read/write to the containerized ledger data to update the status of pending Requests from Friends related to the transaction.

Although FIG. 1A-9B describe several entities and processing or computing components within disclosed systems, any number or combination of components may be implemented without departing from the scope of the disclosed embodiments. For example, different user systems may interact with one or more P2P service systems through a network or standard channels of trade, such as face-to-face purchase transactions. In another example, different financial service provider systems may interact with one or more user systems and P2P service systems through a network or standard channels of trade.

Figure 4B:
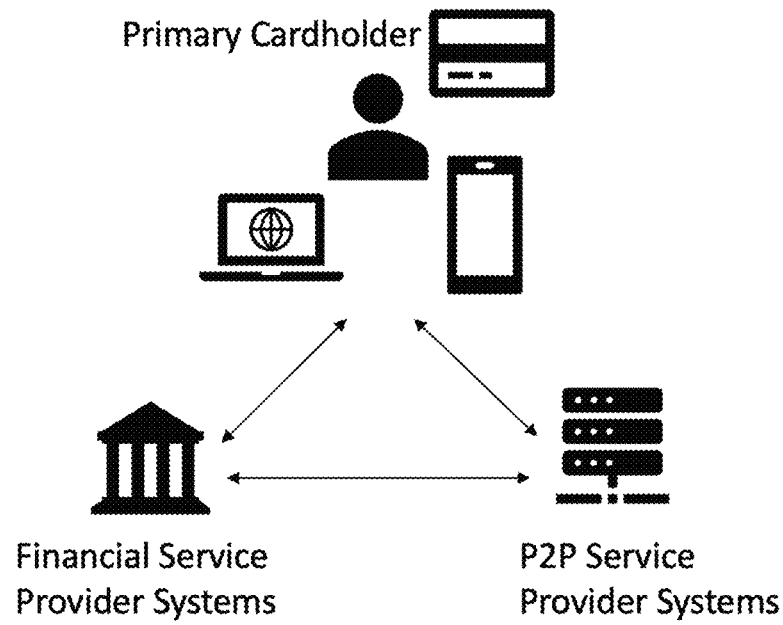
Figure 5A:
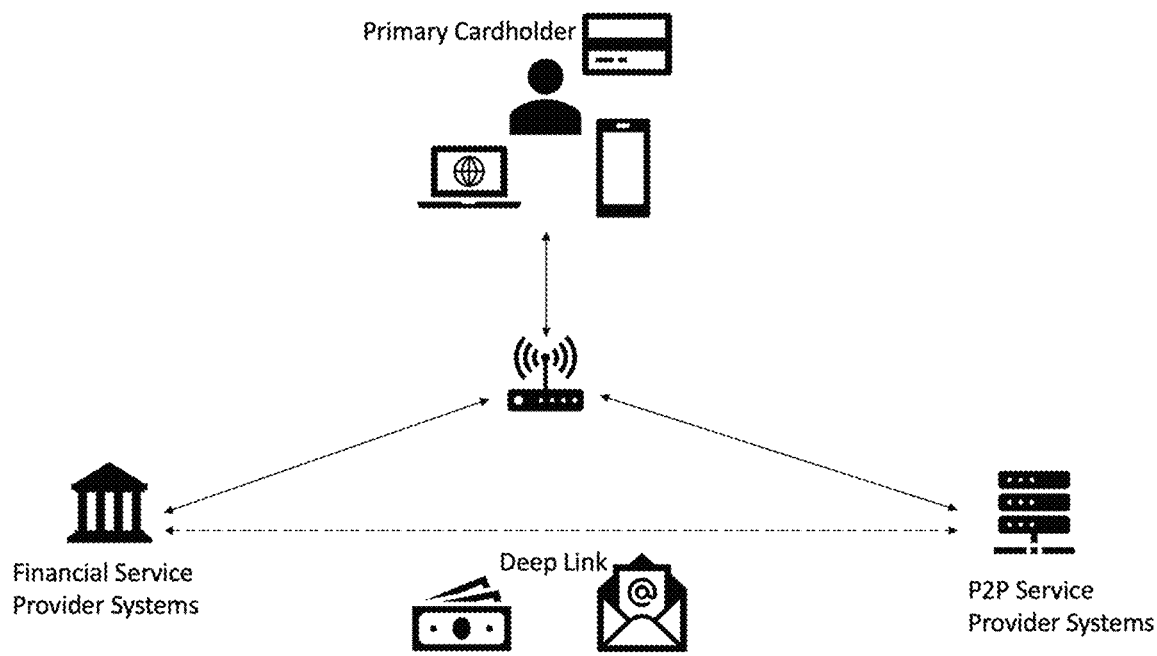
Figure 5B:
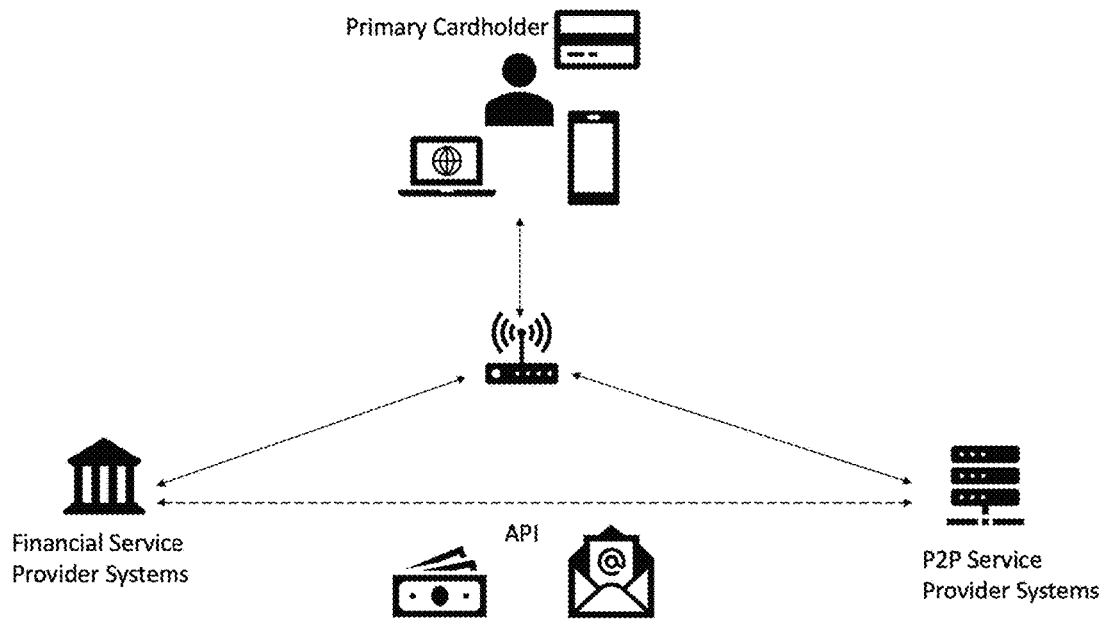
Figure 6:
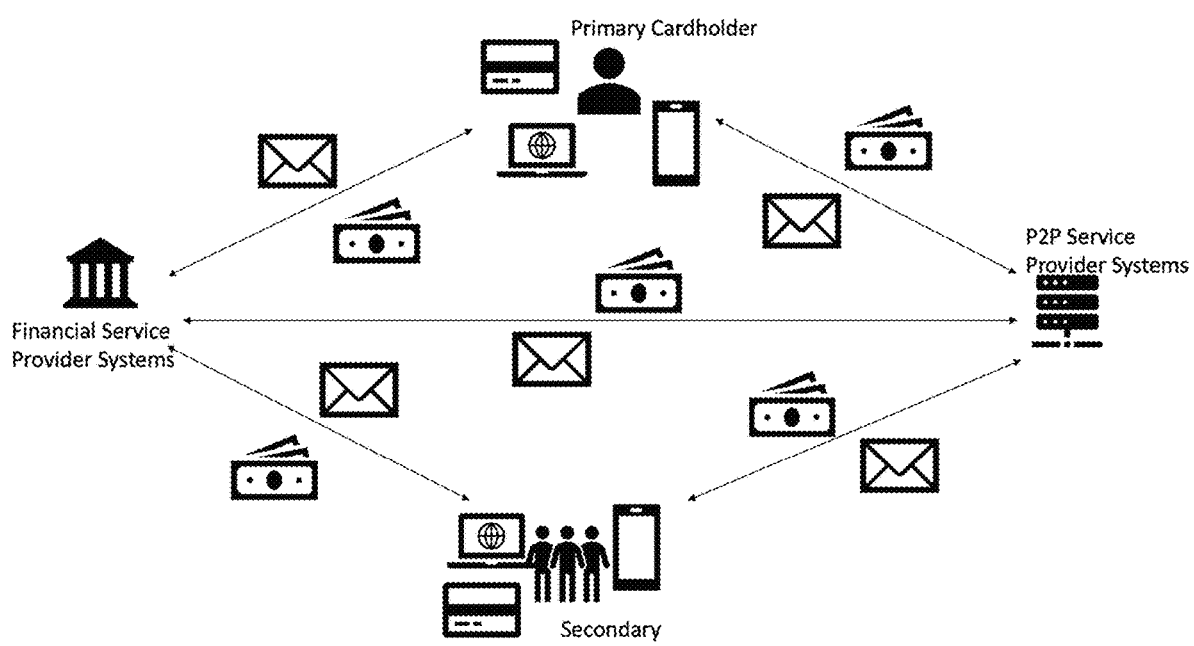
FIG. 6 illustrates networking between participating systems wherein certain data may be exchanged via data links. The exemplary network illustrates possible dataflow within such a network.
Figures 7A, 7B, 7C:
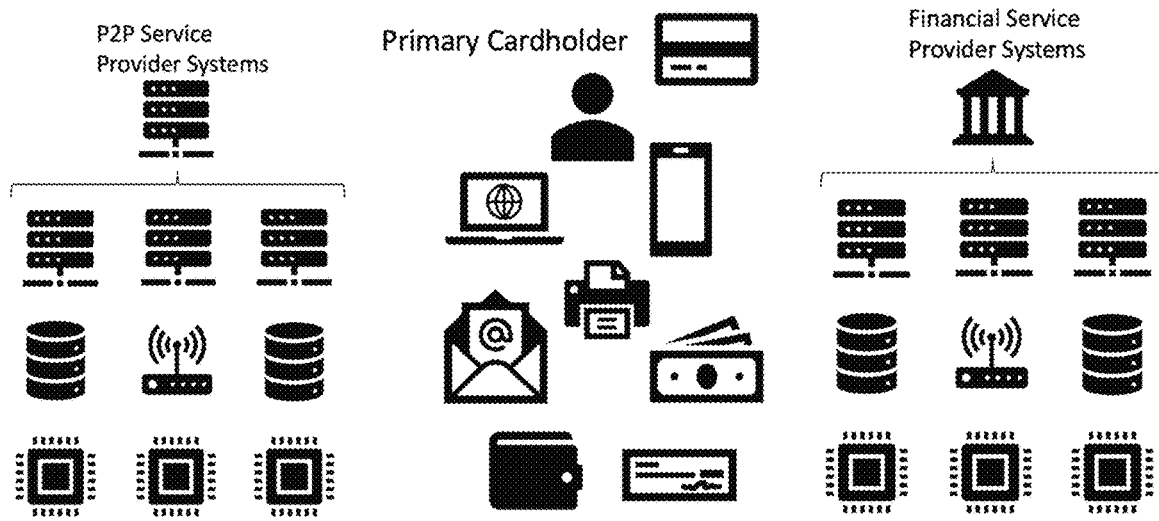
Figure 8:
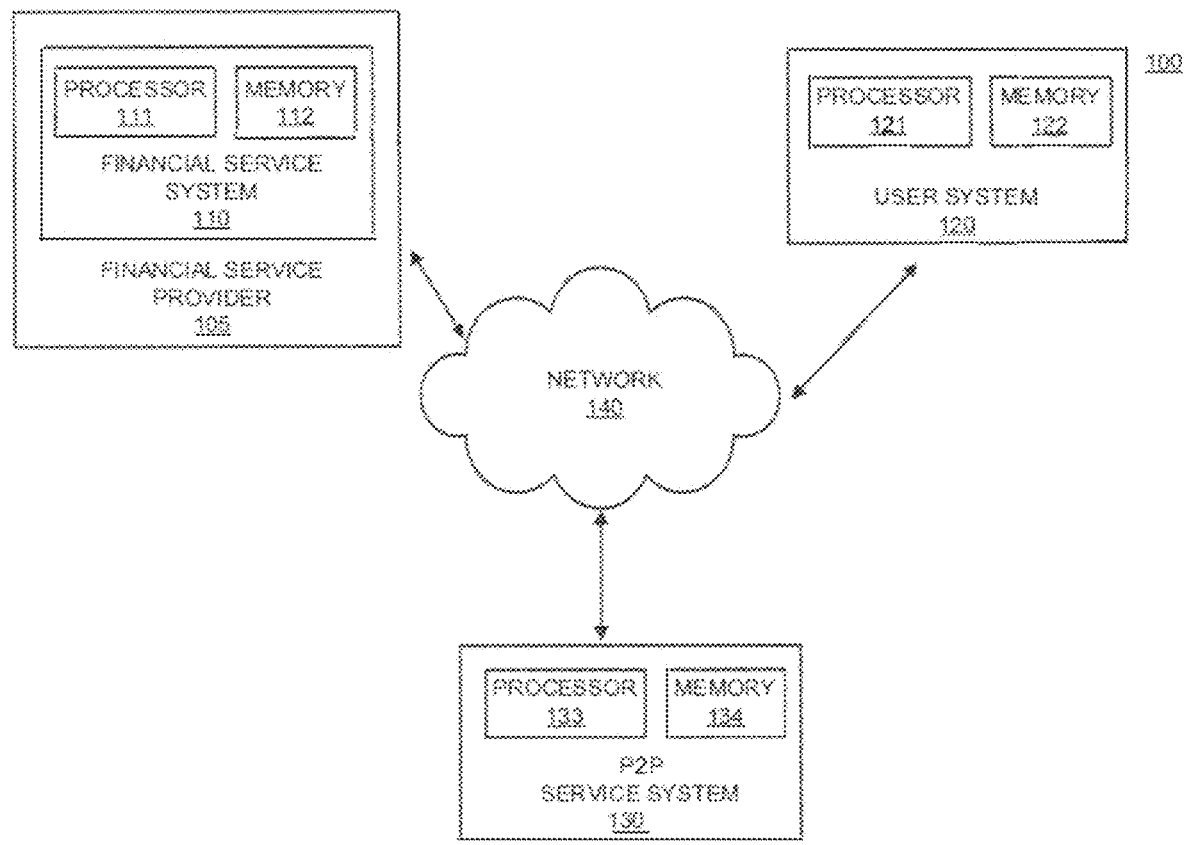
FIG. 8 illustrates an exemplary system consistent with disclosed embodiments. In one aspect, system may include a financial service provider, a user system, a P2P service system, and a network.

Additionally, financial service provider system 110, user system 120, and P2P service system 130, illustrated in FIG. 8, and described more fully below, may not be mutually exclusive. For example, in one embodiment, financial service provider system 110 and P2P service system 130 may be the same entity. In another embodiment, user system 120 and P2P service system 130 may be the same entity. Thus, the entities as described are not limited to their discrete descriptions herein. Further, where different components of a system, such as system environment 100 in FIG. 8, are combined (e.g., financial service system 110 and P2P service system 130, etc.), the computing and processing devices and software executed by these components may be integrated into a local or distributed system.

In some embodiments, the financial service provider system, user system, and P2P service system also include one or more additional components (not shown) that provide communications with other components of the system environment, such as through a network, or any other suitable communications infrastructure.

DESCRIPTION

This disclosure relates generally to the field of P2P payments. More specifically, and without limitation, this disclosure relates to systems and methods for P2P transaction functionality.

Embodiments of the present disclosure may be implemented using at least one processor and at least one memory, as described below. In some embodiments, the at least one processor may comprise a microprocessor, such as a central processing unit (CPU), a graphics processing unit (GPU), or other electronic circuitry capable of carrying out the instructions of a computer program by performing the operations specified by the instructions. Alternatively, or concurrently, the at least one processor may comprise one or more special-purpose devices built according to embodiments of the present disclosure using suitable circuit elements, e.g., one or more application-specific integrated circuits (ASICs), field-programmable gate arrays (FPGAs), or the like. In some embodiments, the at least one memory may comprise volatile memory, such as random-access memory (RAM), a non-volatile memory, such as a hard disk drive, a flash memory, or the like, or any combination thereof.

FIG. 8 illustrates an exemplary system 100 consistent with disclosed embodiments. In one aspect, system 100 may include a financial service provider 105, a user system 120, a P2P service system 130, and a network 140.

Financial service provider 105 may be one or more entities that configure, offer, provide, and/or manage financial service accounts, such as credit card accounts, debit card accounts, checking or savings accounts, loyalty accounts, and/or loan accounts. In one aspect, financial service provider 105 may include or be associated with a financial service system 110 that may be configured to perform one or more aspects of the disclosed embodiments. In some embodiments, financial service system 110 may configure one or more accounts for a customer of financial service provider 105. In these embodiments the customer may be a cardholder or a user operating user system 120, using information pertaining to one or more additional financial service accounts provided by financial service provider 105 associated with financial service system 110.

Financial service system 110 may be a system associated with one or more entities that configure, offer, provide, and/or manage financial service accounts, such as credit card accounts, debit card accounts, checking or savings accounts, and loan accounts. In some embodiments, financial service system 110 may receive and process payments from customers (via, e.g., user system 120) relating to provided financial service accounts. In some embodiments, financial service system 110 may be configured to transmit financial information, such as that related to financial service accounts, creditworthiness, etc., related to one or more users operating user system 120, to one or more P2P service systems 130 to provide the user a more informed experience.

Financial service system 110 may be configured to assess the creditworthiness and risk presented by a prospective buyer of an item or service in real-time or substantially real-time, and to offer different financing packages depending on those assessments.

Financial service system 110 may include one or more components that perform processes consistent with the disclosed embodiments. For example, financial service system 110 may include one or more computers (e.g., servers, database systems, etc.) configured to execute software instructions programmed to perform aspects of the disclosed embodiments, such as generating financial service accounts, maintaining accounts, processing information relating to accounts, etc. Consistent with disclosed embodiments, financial service system 110 may include other components and infrastructure that enable it to perform operations, processes, and services consistent with financial service account providers, such as banking operations, credit card operations, loan operations, etc. Consistent with disclosed embodiments, financial service system 110 may be configured to provide, manage, monitor, and assess a transaction involving user system 120 and/or P2P service system 130.

User system 120 may represent a system associated with an entity seeking to transact with another party. Although the following description of disclosed embodiments may refer to an "individual," in which case user system may comprise a user device such as an electronic device, e.g., smartphone, tablet, personal computer, etc., it is to be understood that the same description applies to multiple users acting in concert or to a user entity in the manner described above. As discussed above, user system 120 may be associated with a customer of financial service provider 105. User system 120 may include one or more components that perform processes consistent with the disclosed embodiments. For example, user system 120 may include one or more computers (e.g., servers, database systems, etc.) that are configured to execute software instructions programmed to perform aspects of the disclosed embodiments. One of ordinary skill in the art would recognize that user system 120 may include components and infrastructure that enable it to perform operations, processes, and services such as processing transactions made over the Internet or in person, and communicating with financial service system 110, P2P service system 130, or other components relating to the transactions. User system 120 may be configured to initiate and complete a transaction, transmit and receive information associated with the transaction to financial service system 110, P2P service system 130, or other components relating to the transactions.

P2P service system 130 may represent one or more entities that provide P2P transaction or P2P payment services to consumers, such as the user operating user system 120. For example, P2P system 130 may represent a vendor or another user that the user operating user system 120, that sends or receives payments relating to one or more of the financial service accounts held by the user and provided by financial service system 110 or P2P service system 130. P2P service system 130 may offer services directly over normal channels of trade (i.e., a point of sale (POS)), or offer services over network 140 (i.e. telephonically or "online" via the Internet).

P2P service system 130 may include one or more components that perform processes consistent with the disclosed embodiments. For example, P2P service system 130 may include one or more computers (e.g., servers, database systems, etc.) that are configured to execute software instructions programmed to perform aspects of the disclosed embodiments. One of ordinary skill in the art would recognize that P2P service system 130 may include components and infrastructure that enable it to perform operations, processes, and services consistent with P2P service providers, such as providing, processing transactions between users, and communicating with financial service system 110 or other components relating to the transactions. Consistent with disclosed embodiments, P2P service system 130 may be configured to transmit and receive information associated with the transaction, and process and monitor account information associated with financing the transaction.

Consistent with disclosed embodiments, components of system 100, including financial service system 110, user system 120, and P2P service system 130, may include one or more processors (such as processors 111, 121, or 133) as shown in exemplary form in FIG. 8. The processors may be one or more known processing devices, such as a microprocessor from the Pentium™ family manufactured by Intel™ or the Turion™ family manufactured by AMD™. The processor may include a single core or multiple core processor system that provides the ability to perform parallel processes simultaneously. For example, the processors may be single core processors configured with virtual processing technologies known to those skilled in the art. In certain embodiments, the processors may use logical processors to simultaneously execute and control multiple processes. The processors may implement virtual machine technologies, or other similar known technologies to provide the ability to execute, control, run, manipulate, store, etc. multiple software processes, applications, programs, etc. In some embodiments, the processors may include a multiple-core processor arrangements (e.g., dual or quad core) configured to provide parallel processing functionalities to enable computer components of financial service system 110, user system 120, and/or P2P service system 130 to execute multiple processes simultaneously. Other types of processor arrangements could be implemented that provide for the capabilities disclosed herein. Moreover, the processors may represent one or more servers or other computing devices that are associated with financial service system 110, user system 120, and/or P2P service system 130. For instance, the processors may represent a distributed network of processors configured to operate together over a local or wide area network. Alternatively, the processors may be a processing device configured to execute software instructions that receive and send information, instructions, etc. to/from other processing devices associated with financial service system 110 or other components of system 100. In certain aspects, processors 111, 121, and/or 133 may be configured to execute software instructions stored in memory to perform one or more processes consistent with disclosed embodiments.

Consistent with disclosed embodiments, components of system 100, including financial service system 110, user system 120, and P2P service system 130, may also include one or more memory devices (such as memories 112, 122, and 134) as shown in exemplary form in FIG. 8. The memory devices may store software instructions that are executed by processors 111, 121, and/or 133, such as instructions associated with one or more applications, network communication processes, operating system software, software instructions relating to the disclosed embodiments, and any other type of application or software known to be executable by processing devices. The memory devices may be volatile or non-volatile, magnetic, semiconductor, tape, optical, removable, nonremovable, or other types of storage devices or tangible computer-readable media. The memory devices may be two or more memory devices distributed over a local or wide area network, or may be a single memory device. In disclosed embodiments, the memory devices may include database systems, such as database storage devices, configured to receive instructions to access, process, and send information stored in the storage devices.

In some embodiments, financial service system 110, user system 120, and P2P service system 130 may also include one or more additional components (not shown) that provide communications with other components of system environment 100, such as through network 140, or any other suitable communications infrastructure.

Network 140 may be any type of network that facilitates communications and data transfer between components of system environment 100, such as, for example, financial service system 110, user system 120, and P2P service system 130. Network 140 may be a Local Area Network (LAN), a Wide Area Network (WAN), such as the Internet, and may be a single network or a combination of networks. Further, network 140 may reflect a single type of network or a combination of different types of networks, such as the Internet and public exchange networks for wireline and/or wireless communications. Network 140 may use cloud computing technologies. Moreover, any part of network 140 may be implemented through infrastructures or channels of trade to permit operations associated with financial accounts that are performed manually or in-person by the various entities illustrated in FIG. 8. Network 140 is not limited to the above examples and system 100 may implement any type of network that allows the entities (and others not shown) included in FIG. 8 to exchange data and information.

Although FIG. 8 describes a certain number of entities and processing/computing components within system 100, any number or combination of components may be implemented without departing from the scope of the disclosed embodiments. For example, different user systems 120 may interact with one or more P2P service systems 130 through network 140 or standard channels of trade, such as face-to-face transactions. In another example, different financial service systems 110 may interact with one or more user systems 120 and P2P service systems 130 through network 140 or standard channels of trade.

Additionally, financial service system 110, user system 120, and P2P service system 130 are not necessarily mutually exclusive. For example, in one embodiment, financial service system 110 and P2P service system 130 may be the same entity. In another embodiment, user system 120 and P2P service system 130 may be the same entity. Thus, the entities as described are not limited to their discrete descriptions above. Further, where different components of system environment 100 are combined (e.g., financial service system 110 and P2P service system 130, etc.), the computing and processing devices and software executed by these components may be integrated into a local or distributed system.

When the financial service provider system creates an account for a user of its services, the user may be issued a card as a physical or electronic representation of an account which may be used by a user, further referred to herein as a cardholder for transactions, wherein electronic representation of a card may be linked to variety of cardholder devices and accounts. In one embodiment, the cardholder device may be a computer system or device operated by a user who is a customer or a potential customer of a financial-service provider. Cardholder device(s) may be one or more computer systems. For example, the cardholder device may include a general-purpose or notebook computer, a mobile device, a server, a desktop computer, a tablet, or any combination of these computers and/or affiliated components. The cardholder device may be configured with storage such as a computer-readable storage medium that stores one or more operating systems that perform operating-system functions when executed by one or more processors. For example, the operating systems may include Microsoft Windows™, Unix™, Linux™, Apple™ operating systems, Personal Digital Assistant (PDA) type operating systems, such as Microsoft CE™, or other types of operating systems. Accordingly, disclosed embodiments operate and function with computer systems running any operating system. Cardholder device storage may also store one or more programs that, when executed by a processor, provide communications via a network, such as Web browser software, networking software, etc., with other users, one or more financial service providers, and one or more third-party P2P systems.

Rewards-Based P2P Funding

A first embodiment provides a transaction system for funding a P2P service system using incentive programs operated by a financial service provider system (generally referred to herein as the "bank" or "card issuer") that issues a credit card. Incentive programs include, but are not limited to cashback, reward points, miles, etc. The transaction system comprises the financial service provider system, one or more P2P service systems, and one or more cardholder devices. The financial service provider system comprises systems implemented by a financial service provider, bank, card issuer, etc., to facilitate incentive programs. The one or more P2P service systems comprise systems implemented by a participating P2P service system provider to facilitate person-to-person or peer-to-peer money transfers. P2P service system providers could include services such as Zelle, Venmo, PayPal, SquareCash, etc.

A cardholder may have a credit or debit card enrolled in an incentive program with the financial service provider system. The cardholder may want to use accumulated rewards to fund a P2P service system account (e.g. Zelle, Venmo, PayPal, SquareCash, etc.) The disclosed embodiment provides a solution that links earned rewards to the P2P service system of choice, thereby simplifying monetization of reward balances.

Monetizing rewards balances has always been difficult, leading to solutions in automated statement credits for transactions through rewards redemptions, using rewards at e-commerce hubs, and redeeming gift cards. Funding of a P2P service system is a solution that links rewards to social experiences customers enjoy. This solution allows a customer/cardholder to use a rewards balance on a credit card to send P2P funds over a variety of channels. These channels could include Zelle, Venmo, PayPal, SquareCash, etc. The solution links the rewards balance earned by the cardholder within public P2P experiences with a deep link secure process and imprints the primary device used for future easier use. As used herein, deep link refers to linking between digital experiences provided by independent systems wherein linking is performed within one digital experience to another digital experience without disrupting an immersion, wherein immersion refers to a process in which a user does not have to leave one experience to access another. In exemplary embodiments, a digital experience may be an application on a mobile device, a website, or the like. Then, as the cardholder is in other P2P experiences, like Venmo, Zelle, PayPal, SquareCash, etc., the cardholder can see a total balance that includes both their bank-funded balance and their additional rewards balance available for P2P and social money sending.

The financial service provider system, e.g. a bank, may provide the cardholder with an enrollment process necessary for the cardholder to use accumulated rewards balances for fund transfers, payments and other transactions facilitated by a P2P service system. In one exemplary embodiment, once the cardholder is enrolled in rewards-based P2P funding, the financial service provider system is configured to perform a set of instructions including establishing a token-based authentication (e.g. OAuth) with a P2P service system, authenticating the cardholder within a P2P service system, via deep linking, granting access to rewards accumulated for use within P2P service systems, and cryptographically imprinting the cardholder's device simplifying future access. Cryptographical imprinting refers to a process of recording unique information about the cardholder's device, e.g., serial number, to be recognized by the system as a trusted device. Alternatively, unique data may be saved on the cardholder's device for recognition by the system in a, e.g., cookie or certificate.

When the cardholder attempts to use the rewards within the P2P service systems, e.g., funding an account, transferring money to another user, etc., the financial service provider system may perform additional steps. In one exemplary embodiment steps embodied in a set of instructions include: receiving a request for redeeming rewards from the P2P services systems, verifying sufficiency of the balance available to the cardholder, sending an approval of the transaction to the P2P services systems, receiving confirmation from the P2P service system, adjusting the rewards balance based on a received confirmation, and sending the adjusted rewards balance information to the P2P service system.

Consistent with exemplary embodiments herein, the P2P service system may comprise at least one memory storing instructions and at least one processor configured to execute the instructions to perform operations.

The P2P service system, e.g. Zelle, Venmo, PayPal, SquareCash, etc., provides the cardholder with an integrated deep link experience wherein the cardholder can easily see and use accumulated reward balances from within the P2P service system. In one exemplary embodiment, once the bank enrolls a cardholder in rewards-based P2P funding, P2P service systems are configured to perform a set of instructions including: establishing a token-based authentication (e.g. OAuth) with the financial service provider system, authenticating cardholder with the financial service provider system, and providing a deep linking experience wherein the cardholder does not need to separately login to the bank account to redeem accumulated rewards.

When the cardholder attempts to redeem rewards earned within the financial service provider system, e.g., by funding the P2P account, transferring money to another user, etc., the P2P system may perform additional steps. In one exemplary embodiment such additional steps embodied in a set of instructions include: sending a request for redeeming rewards to the financial service provider system, and receiving a redemption approval from the financial service provider system, sending a confirmation of the transaction to the financial service provider system, and receiving a new rewards balance from the financial service provider system.

In an exemplary embodiment, the cardholder may use an electronic device, e.g., smartphone, tablet, personal computer, etc., to enroll in a reward based P2P funding. The cardholder's device may display and allow redemption of accumulated reward balances from within a single application or a website, providing an integrated solution to monetizing reward balances. In one exemplary embodiment, once the cardholder's device is enrolled in rewards-based P2P funding, the cardholder device may be configured to perform a set of actions. The cardholder device is capable of displaying a current rewards balance and enabling a cardholder to use the rewards balance directly without going through the financial service provider system. The displayed balance may include a total balance that includes both bank-funded balances and an additional rewards balance for P2P and social money sending. Bank-funded balance as used herein refers to the balance resulting from payments made or received on the cardholder account, and rewards balance refers to the balance accrued by utilizing incentive programs offered. Rewards can be redeemed by funding the P2P account, transferring money to another user, etc. All actions are available within a single P2P application via deep-linking between the financial service provider system and the P2P service system.

In one exemplary embodiment upon enrollment or redemption of the reward balance, the cardholder device may enable the cardholder to share the experience or transaction details into the social P2P feed.

Payment Collection from Third Party Sources

A second embodiment provides for payment collection from third party sources.

People often use their credit card for transactions involving friends and later get paid back by their friends. The friends may pay back the credit card holder via their social P2P accounts. However, it is sometimes difficult to get those paid back funds from social P2P accounts to the credit card. Currently, the cardholder would need to transfer money from the P2P account to their primary banking account, which may take a long time, and then make a credit card payment from their primary banking account. Deep linking reduces the time it takes for money to move around significantly, by removing an intermediary account and immediately applying transferred funds as a payment to the credit card.

This second embodiment allows for linking of social P2P service systems, like SquareCash, Venmo, PayPal, etc., to share balance and funding account information to pay a credit card bill. The cardholder who has both the credit card balance and the social P2P service system can enroll in a payment collection service, thereby initiating a process handled by the financial service system and P2P service systems to establish a deep link between the credit card and P2P accounts through token-based authentication (e.g. OAuth) to pay from the P2P service system balances. Further, the linking creates the opportunity to further fund, or solely fund, the payment from the P2P bank funding account, be it a DDA (demand deposit account) or a debit card. A cardholder is thus enabled to use funds, where they have been paid back by friends directly, to pay to their credit card balance and not make a separate payment involving their primary banking relationship account.

A cardholder may have an enrolled credit card in a P2P service system with the financial service provider system, allowing for direct payment to the credit card. The enrollment process is similar to the first embodiment, wherein the process may involve token-based authentication and deep-linking between the financial service provider system and P2P service systems. The cardholder may want to pay a credit card balance using the P2P service system account (e.g. SquareCash, Venmo, PayPal, etc.) directly without first moving money to an intermediary account. The present (second) embodiment provides a solution that allows a cardholder to pay a credit card balance from a P2P service system.

Consistent with exemplary embodiments herein, the financial service provider system may comprise at least one memory storing instructions and at least one processor configured to execute the instructions to perform operations.

When the cardholder attempts to pay a balance of an enrolled credit card, in addition to the previously described steps for enrollment, the financial service provider system may perform additional steps. In one exemplary embodiment steps embodied in a set of instruction include: receiving from a cardholder authorization to make a payment from one of the enrolled P2P service systems, sending to the P2P service system selected by the cardholder authorization for payment, receiving full or partial funds from the P2P service system, and applying the received funds to the cardholder's credit card balance.

When the cardholder attempts to pay a balance of an enrolled credit card, in addition to the previously described steps for enrollment, the P2P service systems may perform additional steps embodied in a set of instructions including: receiving from the financial service provider system a cardholder authorization to make a payment, and sending an amount of funds specified in the authorization to the financial service provider system to be applied directly to the cardholder's credit card balance.

In addition to payment collection from a third party source, there may be a need for P2P payment application to a credit card transaction. Aspects of this modification to the second embodiment are illustrated in FIGS. 1A-1C.

When a person tries to split a bill at a restaurant or bar they pay for with friends, there are a multitude of services to make that possible, such as Venmo, Zelle, PayPal, SquareCash, etc. But while the person is waiting to get paid back by the friends, they may be assessed interest charges, or worse, be late on paying for that transaction. In addition to the previously disclosed embodiments, the present embodiment includes a request service used to record that repayment from third parties with whom an expense was shared. In addition, as multiple cardholders may be involved in the transaction, secondary cardholders' devices need to be taken into account.

With this modification to the second embodiment, there is a need for an inbound payment or credit to be applied directly to transactions as opposed to the balance on a credit card. The inbound credits originate from P2P service systems, e.g., PayPal, Venmo, Zelle, SquareCash, etc. In an exemplary embodiment, the credit may be repayment for a split transaction. Data about the transaction is collected from social services and networks during the transaction and later used in applying the inbound credits by matching collected data with the inbound credit to apply to the correct transaction, wherein transaction data includes date, location, transaction amount, split amounts, etc. The collection of transaction data is performed via deep link sharing between the financial service provider system and the P2P service systems.

A link between the card used in the transaction and the request service is utilized to record that repayment from third parties is expected and to grant special rights and privileges to the cardholder for that transaction. Further, the link is used to post an inbound payment or credit to the specific transaction as opposed to the overall balance. The inbound credit, which is tied to the transaction through the data collection is immediately transferred into the balance of the cardholder and applied to the specific transaction. The balance is then adjusted as the credit is applied.

This modification to the second embodiment allows for the fine application of interest based on a final transaction amount, as opposed to a calculation based on Average Daily Balance and the APR. The applied interest is based on a set of business rules defined by the bank and the interest only accrues for the final amount of the transaction after all credits have posted, not on the original amount. In an exemplary embodiment, interest may be applied only to a portion of the transaction attributed to the cardholder, wherein the rest of the transaction may be delayed from incurring interest for a specified period of days.

For example, when friends go out, usually one of the friends will pay the bill. In order to get paid back, that person (cardholder) may receive a Venmo payment to their account balance, stored and controlled by Venmo, a PayPal payment to their account at that service, and maybe another payment from a Zelle user to the cardholder's deposit account, or any other combination of P2P service system payments. The cardholder must then take those disparate payments and make a payment on the credit card balance. This can be a burdensome process. Additionally, if the cardholder is revolving a balance, they are being assessed interest charges on the original total of the transaction for the days the balance remains unpaid.

An additional modification to the present embodiment may include social payment pressure for transaction splitting repayment. Aspects of the modified embodiment are illustrated in FIGS. 2A-2C.

The modified embodiment uses data about a card transaction that is subsequently split across multiple friends and requests repayment from those friends in a social P2P setting to prompt timely and relevant repayment by those friends who owe money as a portion of that transaction. A cardholder who makes a purchase and then makes requests to friends who participated would use their preferred social P2P service system of choice, Zelle, Venmo, PayPal, SquareCash, etc. The data about the transaction would be linked to the Request for Repayment in that P2P service system. The issuing bank would then use data about the card's minimum payment and due date to prompt unpaid requests for payment for parties to issue funds to the initial funder or cardholder, so the cardholder can avoid interest, late payments, etc. The initial funder, as used herein, refers to the person who initially funded the purchase, the initial funder typically, but not necessarily, being. These reminders would still be processed by the P2P provider and would be prompted based on shared trigger messages from the financial service provider system. The initial card transaction may also be shared in the social P2P feed to further enhance the prompting experience.

When a person picks up the tab for friends, it may be difficult to get paid back. Even when the person requests repayment from their friends via P2P service systems, the person may not get paid back promptly. And worse, the person may consider it rude and awkward to keep asking. The solution of the present embodiment avoids the awkwardness of asking for the repayment to be made and uses light guilt and social pressure to ensure friends stay friends when they owe each other money.

When a person tries to split a bill at a restaurant or bar that they pay for with friends, there are many services to make that possible: Venmo, Zelle, PayPal, SquareCash, even real cash. Putting a "request" for repayment out to friends is one thing, while getting paid back is another. And continuing to ask can often be awkward. The solution of the present embodiment uses connectivity between the card used for this transaction and the request service used for repayment to spark a higher rate of repayment promptly, without the awkwardness.

A cardholder may have an enrolled credit or debit card in a P2P service system with the financial service provider system, allowing for direct payment application to a bank card transaction wherein the bank card may be a credit or debit card. The enrollment process is similar to that described for prior embodiments in which the process may involve token-based authentication and deep-linking between the financial service provider system and P2P service systems. The cardholder may want to apply funds received as a repayment for a specific transaction using a P2P Service system account (e.g. Zelle, Venmo, PayPal, SquareCash, etc.) applied directly to the transaction. The present embodiment provides a straightforward solution that allows a cardholder to record that repayment is expected for the transaction, and then subsequently posts an inbound payment or credit from a P2P service system to that specific transaction as remittance is received.

When the cardholder attempts to record that repayment is expected for the transaction, e.g., splitting a bill at the restaurant, in addition to previously described steps for enrollment, the financial service provider system may perform additional steps embodied in a set of instructions including: providing API links to P2P service systems to allow for data transmission, wherein data transmitted over the API may include ID validation based on public and private shared info, transaction data, balance data, due date, repayment data, etc.; receiving transaction information from the vendor where the card was used; and analyzing the transaction based on the category, location, amount, past transaction history or the like, wherein analysis can be performed using machine learning, neural networks, a categorical approach, etc. A categorical approach, as used herein, is an approach that applies specific filters to the data that is analyzed, e.g. location based, amount over/under a certain value, etc. Based on the results of the analysis, the cardholder is provided with a suggestion to record that repayment is expected for this transaction. Alternatively, the cardholder may manually tag a transaction identifying that repayment is expected. Based on the confirmation from the cardholder, the financial service provider system will inquire for additional information. Additional information may include the identifying information and number of people the repayment is expected from, amount of repayment per person, type of repayment (e.g., which P2P service system the repayment will come from or which P2P service system the repayment reminder should be sent to), expected date of the repayment, etc. Some or all information might be prepopulated based on the transaction data. The financial service provider system may perform additional steps embodied in instructions including: confirming the request for the repayment, sending one or more requests for repayment to one or more P2P service systems, and receiving repayment act, date, amount, and a sender from the P2P service system. Additionally, if payment is not received in a timely manner, e.g., by the specified date or date of the statement for the cardholder, the financial service provider system may send a reminder request to a P2P service system to be posted to the appropriate person. After the repayment is received, the financial service provider system applies the repayment to the original transaction performed on the card and recalculates interest accordingly if necessary.

When the cardholder attempts to record that repayment is expected for the transaction, e.g. splitting a bill at the restaurant, in addition to previously disclosed steps for enrollment, the P2P service systems may perform additional steps embodied in a set of instruction including: receiving API links from the financial service provider system to allow for data transmission, wherein data transmitted over the API may include ID validation based on public and private shared info, transaction data, balance data, due date, repayment data, etc.; receiving transaction information from financial service provider system tagged as repayment is expected, wherein transaction data may include a number of people the repayment is expected from, amount of repayment per person, expected date of the repayment, etc.; identifying secondary users of the P2P service system listed as people whom the repayment is requested from; sending one or more requests for repayment to one or more secondary users of the P2P service systems; receiving repayment from secondary users of the P2P service systems; if repayment is not received, sending notifications to the appropriate secondary users based on the information received from the financial service provider system; sending data including repayment act, date, amount, and a sender to the financial service provider system; and if a reminder request is received from the financial service provider system, sending a notification to the appropriate secondary user. Secondary users, as used herein, are users of the P2P service system other than the cardholder. The cardholder may be considered a primary user in this context.

In an exemplary embodiment, the cardholder may use an electronic device, e.g. smartphone, tablet, personal computer, etc., to enroll in a transaction repayment service. In addition to previously disclosed steps for enrollment, the cardholder's device may: receive and display push notifications or the like which suggest tagging certain transactions for repayment based on the information received from the financial service provider system; tag a transaction and identify which P2P service system will be used for the repayment; share location services with the financial service provider system for populating required repayment information; and collect and send other identifying transaction information and repayment options as necessary, wherein all actions are available within a single financial service provider application via deep-linking between the financial service provider system and a P2P service system.

In an exemplary embodiment, a secondary user may use an electronic device, e.g. smartphone, tablet, personal computer, etc., to repay a cardholder enrolled in a transaction repayment service. The secondary user's device may receive a request for the repayment in one or more P2P service system applications. Further, the secondary user's device may display notifications or post repayment details on the social P2P feed.

In another exemplary embodiment, the transaction data passed between the financial service provider system and P2P service systems may be recorded on to a blockchain which may be shared between the financial service provider system and P2P service systems, wherein the blockchain includes the original transaction split into blocks based on the P2P service system used for repayment. Such an approach ensures that all repayment transactions within a block are verified, cleared, and stored in a block linked to a preceding block, creating a complete chain for each transaction.

Social Trip Management and Planning

A third embodiment provides social trip management and planning. Aspects of the fifth embodiment are illustrated in FIGS. 3A-3C.

It can be difficult to have "money pools" that automatically track new transactions as they enter a shared social experience of a trip or travel. Today, users may need to increase the money pool amount, predict how much money will be needed ahead of time, or worse, try to add up expenses after the fact. The present embodiment reduces the cognitive load of that process, by automatically adding any tagged transactions to the pool and tagging those that owe it, which serves to reduce the effort to determine amounts owed and the awkwardness of the experience.

The present embodiment is intended to simplify trip planning and expense sharing with friends. The primary spender would use their card consistently throughout the process. The primary spender would initiate an event either manually or by creating a trigger transaction, e.g., booking a hotel, buying a plane ticket, or renting a car. The financial service provider system may automatically tag the transaction based on the result of the analysis performed using machine learning, neural networks, a categorical approach, or the like. Additionally, there could be one or more secondary spenders who spend lower amounts throughout the process.

In an exemplary situation, once the primary spender books lodging it would trigger an event notification from the financial service provider system. The lodging booking is the trigger to start a trip plan or bucket of shared expenses that need to be split across friends. Once confirmed by the primary spender, a trip plan bucket will be established. The primary spender links other participants in their P2P service system of choice: PayPal, Venmo, Squarecash, Zelle, etc. Each friend will have access to see what is owed by them or to them as it accrues for lodging, food, travel, events, outings etc. Transactions might be tagged to specific participants if for example certain expenses are only shared by a subgroup. The embodiment also allows for participants to become secondary spenders by linking their cards if they so choose and add their own transactions to the pool that need to be paid back. When the trip ends or periodically throughout the process, as certain points or triggers are met, the funds are disbursed as needed. The amount is calculated by the primary spender's financial service provider system and is repaid by payments across one or more P2P service systems, based on participants. The repayment might be applied as disclosed in previous embodiments directly to the credit card balance of spenders, used to fund a P2P service system account of the primary spender or deposited in the regular banking accounts of spenders.

Transactions could be automatically tagged by the financial service provider system to easily manage those that owe portions of it by relying on transaction data and performing an analysis by using machine learning, neural networks, a categorical approach, or the like. Funds can be requested automatically when the trip ends or periodically when certain triggers are met, e.g. X number of days pass from the charge, the total amount is above a threshold specified by the primary spender, the payment is due on a credit card of the primary statement, etc. The funds are auto-requested and disbursed as needed, based on the rules specified by the primary spender.

In addition to previously disclosed actions of enrollment and deep linking between the financial service provider and P2P service systems, the financial service provider system performs additional steps including: analyzing cardholder's transaction on the enrolled card using machine learning, neural networks, a categorical approach, or the like; identifying possible trigger transactions; sending a cardholder a notification when a transaction is identified as a possible event type transaction; receiving confirmation from a cardholder; requesting additional information from a cardholder consisting of at least other participants and their P2P service system account identifiers; creating a bucket based on the confirmation and including a list of participants, wherein, the financial service provider system may Include secondary spenders from a list of participants based on the request of one or more participants with an enrolled card; analyzing future transactions and tagging them appropriately based on machine learning, neural networks, categorical approach, or the like; performing live calculations of amounts owed by each party; sending notifications to the P2P service system(s) specified by the cardholder trigger events asking for payments; using similar mechanisms for payments as disclosed in previous embodiments; and closing the bucket after receiving an instruction from the primary spender/cardholder.

Similarly, in addition to previously disclosed actions of enrollment and deep linking between the financial service provider and P2P service systems, the cardholder device may perform additional steps including: receiving notifications from a financial service provider system that transaction is a possible event type, prompting the cardholder to provide the information required for the creation of a bucket, sending the required information to the financial service provider system, enabling the cardholder to modify automatic transaction tags within a bucket as necessary to split the payment properly, and allowing the cardholder to enter specific trigger events which will initiate the financial service provider system to send a notification to other participants of the event via a deep link with the P2P service systems.

Similarly, in addition to previously disclosed actions of enrollment and deep linking between the financial service provider and P2P service systems, the secondary spender device might perform additional steps including: enabling the secondary spender to join an existing bucket, and adding secondary spender's transactions to the bucket and tagging them appropriately.

In an alternative embodiment, the event bucket may be recorded on to a blockchain which may be shared between financial service provider system and P2P service systems. The blockchain may include all the transactions associated with an event and split into blocks based on the P2P service system used for repayment by different users. Alternatively, the transactions associated with an event may be split into blocks based on the individual transaction, tracking each repayment option. Such an approach ensures that all repayment transactions within a block are verified, cleared, and stored in a block linked to a preceding block, creating a complete chain for all the transactions in the bucket.

Social Reporting and Attribution of a Credit Card Transaction

Figure 9A:
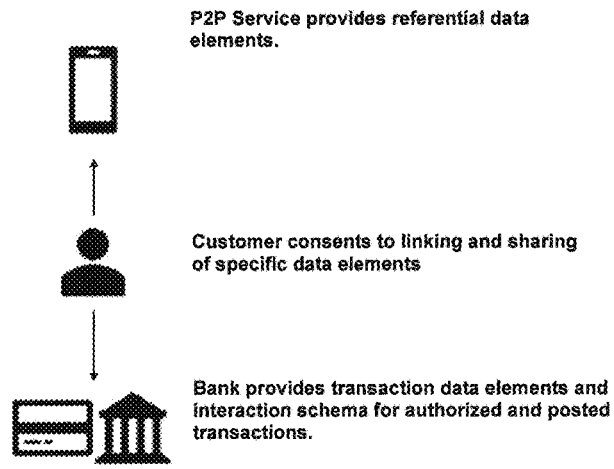
Figure 9B:
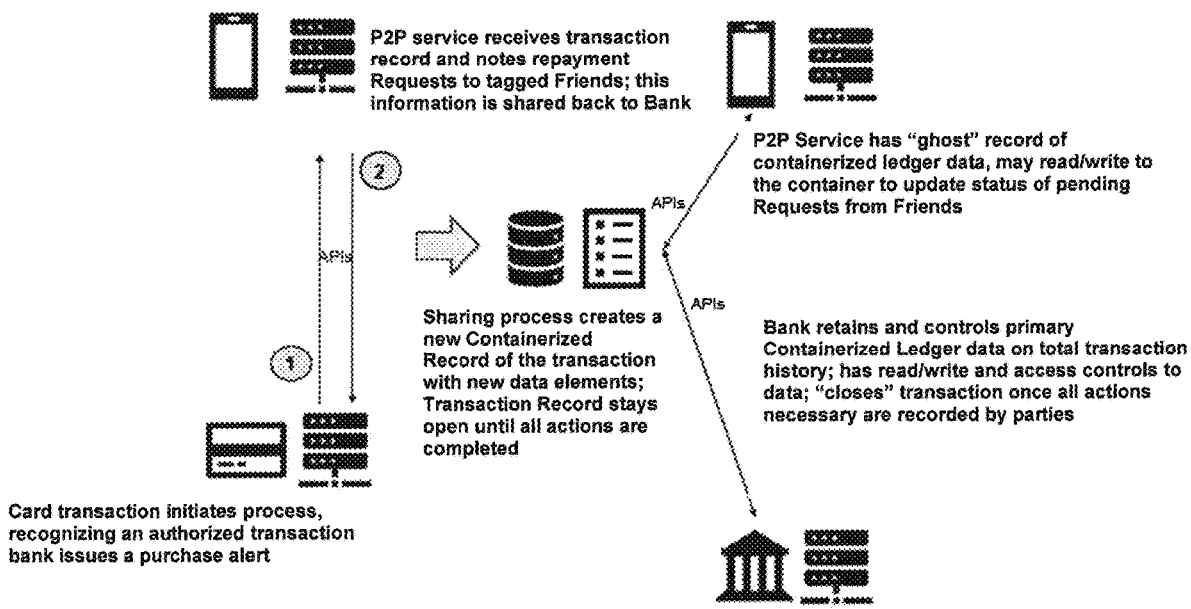

A fourth embodiment provides social reporting and attribution of a credit card transaction. Aspects of the fourth embodiment are illustrated in FIGS. 9A and 9B.

It can be difficult to manage whether you have been paid back by friends for a specific event. This embodiment provides a process of keeping track of whether money repaid by a friend was for the dinner last night, dinner the week before, or something else entirely.

The present embodiment is intended to allow for a transaction, made online or in person, to be attributed to a social feed of a social P2P service system like Zelle, Venmo, Squarecash, PayPal, etc., and to have that transaction tagged and attributed further to third parties who participated in the transaction and event. The embodiment allows for deep link embedding of the transaction data, and enhanced transaction data once scrubbed by proprietary services of a financial service provider system, into the social feed of a cardholder. The cardholder then can tag third parties who participated in the transaction (e.g. friends or acquaintances) to the transaction so their presence was or will be included in the case of booking a future trip. This enables the cardholder to more cleanly request specific amounts of payback from each tagged person in direct relationship to the transaction itself. Additionally, data can be processed by the financial service provider and the cardholder can be presented with one view indicating all of their friends who owe them money at the time of the request in a transaction-by-transaction format, wherein transaction-by-transaction format refers to a view in which a cardholder can view money owed for each transaction on an account independently.

After the cardholder is enrolled in a transaction unification service, cardholder data is shared among entities with which the cardholder consented to linking and sharing of specific data elements. In addition to previously disclosed actions of enrollment and deep linking or an API linking between the financial service provider and P2P service systems, the financial service provider system may perform additional steps including: recognizing an authorized transaction and issuing a notification to a cardholder device, wherein the notification could be a purchase alert which includes an option to send the transaction to the P2P service system for social feed, reporting, and tagging friends for requests; providing card transaction data elements and interaction schema (notifications/alerts with actions) related to authorized and posted transactions, e.g. due dates, payments made or scheduled, etc. to a P2P service system; receiving referential data elements, like "friends", "contacts", "requests", P2P payment history, etc. from the P2P service system; and receiving from a P2P service system repayment records.

Similarly, in addition to previously disclosed actions of enrollment and deep linking between the financial service provider and P2P service systems, the P2P service system may perform additional steps including: sending to a financial service provider referential data elements, like "friends", "contacts", "requests", P2P payment history, etc.; receiving transaction record and repayment requests to certain friends tagged with their amounts; posting on a social feed within P2P service system transaction information, wherein information may include details of the transaction, repayment status, etc.; and sharing the information back to the financial service provider system as information is updated.

The above-described sharing process of the fourth embodiment may create a new containerized ledger for the transaction with new data elements about tagged friends, requests, etc. New data elements that "open" with the purchase authorization do not "close" at posting the way a normal card transaction do, but instead "close" when all required actions have occurred from all parties involved and tagged/linked. In other words, the transaction record stays open until all request and payment actions are completed.

The new data elements may be recorded on to a blockchain which may be shared between financial service provider system and P2P service systems. The blockchain may include all requests and social feed notifications associated with a transaction and split into blocks based on the P2P service system used for repayment by different users. Such an approach ensures that all repayment transactions within a block are verified, cleared, and stored in a block linked to a preceding block, creating a complete chain for each transaction.

In an embodiment that includes a containerized ledger, the financial service provider system may perform additional steps including: creating a centralized ledger; retaining and controlling primary newly created containerized ledger data on a total transaction history (card authorization, card final post, payment history on transaction, Requests, and Request status); retaining full read/write and access controls of data within the ledger; receiving notification from a P2P service system that a transaction is updated; and closing the transaction once all necessary actions are recorded by both parties.

Similarly, in such embodiment in addition to previously disclosed actions, the P2P service system may perform additional steps including: creating a "ghost" record of containerized ledger data; updating ghost record with a status of pending requests from friends related to the transaction; and sending updates to the financial service provider system containing new transaction information.

The foregoing description is presented for purposes of illustration. It is not exhaustive and is not limited to the precise forms or embodiments disclosed. Modifications and adaptations of the embodiments will be apparent from consideration of the specification and practice of the disclosed embodiments.

Computer programs based on the written description and methods of this specification are within the skill of a software developer. The various programs or program modules can be created using a variety of programming techniques. One or more of such software sections or modules can be integrated into a computer system, non-transitory computer readable media, or existing software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A system comprising:
a financial service provider system for obtaining repayment for a transaction, the financial service provider system comprising:
a first memory and a first processor wherein the first memory stores executable instructions that, when executed by the first processor, cause the first processor to perform the functions of:
establishing an API link with a one or more P2P (Peer-to-Peer) service systems;
enrolling, a cardholder device in a service;
receiving, information about the transaction from a vendor;
analyzing, the transaction information based on at least one of a category of the transaction, a location of the transaction, an amount of the transaction, or a past transaction history associated with a card account;

sending, the transaction information to the cardholder device;

receiving a response from the cardholder device, the response including a tagged transaction indicating a request to initiate a repayment;

recording, that the repayment is expected for the transaction, based on the response received from the cardholder device;

querying, the cardholder device for additional information identifying at least one or more requests for the repayment;

receiving, the additional information from the cardholder device identifying the at least one or more requests for the repayment;

confirming, the one or more requests for the repayment with the cardholder device;

sending, the one or more requests for the repayment to the one or more P2P service systems;

receiving, from the one or more P2P service systems, repayment information, regarding one or more repayments; and applying, based on the repayment information, the one or more repayments to the transaction performed on the card; and one or more P2P systems comprising a second memory and a second processor wherein the second memory stores executable instructions that, when executed by the second processor, cause the second processor to perform the functions of:

receiving one or more requests for repayment of a transaction from the financial service provider system;

identifying secondary user accounts of the one or more P2P service systems associated with secondary parties to the transaction based on the one or more requests for repayment received from the financial service provider system, wherein the secondary user accounts are accounts other than a cardholder of the card account used to pay for the transaction;

sending the one or more requests for repayment to the one or more secondary users of the one or more P2P service systems;

receiving repayment in response to the one or more requests for repayment sent from the one or more secondary users of the one or more P2P service systems; and sending, to the financial service provider system, repayment information regarding the repayments from the secondary users of the one or more P2P service systems, the repayment information including a repayment act, a date of repayment, an amount of repayment, and an identification of at least one of the secondary users.

2. The system of claim 1, wherein the operations further comprise: establishing a deep link between the financial service provider system and one or more P2P service systems.

3. The system of claim 2, wherein the establishing the link comprises ID validation based on public and private shared information.

4. The system of claim 3, wherein data transmitted over the link comprises one or more of transaction data, balance data, due date, or repayment data.

5. The system of claim 1, wherein the analysis of the transaction information is performed using machine learning, neural networks, or a categorical approach.

6. The system of claim 1, wherein the additional information comprises at least one of identifying cardholder information, a number of persons from which repayment is expected, an amount of repayment per person, type of repayment, or expected date of repayment.

7. The system of claim 1, wherein the additional information is at least partially prepopulated based on the transaction information.

8. The system of claim 1, wherein transaction information passed between the financial service provider system and the one or more P2P service systems is recorded on to a blockchain.

9. The system of claim 8, wherein the blockchain is shared between the financial service provider system and the P2P service systems.

10. The system of claim 9, wherein the blockchain includes the transaction information split into blocks based on a specific P2P service system used for repayment, wherein the specific P2P service system is one of the one or more P2P service systems.

11. The system of claim 1, the operations further comprising:

recalculating an interest based on the applied one or more repayments to the transaction performed on the card.

12. The system of claim 1, the operations further comprising:

sending, to the one or more P2P service systems selected by the cardholder, authorization for payment, receiving full or partial funds from the P2P service system, and applying the received funds to a balance of the card.

13. A computer-implemented method for obtaining repayment of a transaction, the method comprising:

establishing by a financial service provider system, an API link with a one or more P2P (Peer-to-Peer) service systems;

enrolling by the financial service provider system, a cardholder device in a service;

receiving by the financial service provider system, information about the transaction from a vendor;

analyzing by the financial service provider system, the transaction information based on at least one of a category of the transaction, a location of the transaction, an amount of the transaction, or a past transaction history associated with a card account;

sending by the financial service provider system, the transaction information to the cardholder device;

receiving by the financial service provider system, a response from the cardholder device, the response including a tagged transaction indicating a request to initiate a repayment;

recording by the financial service provider system, that the repayment is expected for the transaction, based on the response received from the cardholder device;

querying, by the financial service provider system, the cardholder device for additional information identifying at least one or more requests for the repayment;

receiving by the financial service provider system, the additional information from the cardholder device identifying the at least one or more requests for the repayment;

confirming by the financial service provider system, the one or more requests for the repayment with the cardholder device;

sending by the financial service provider system, the one or more requests for the repayment to the one or more P2P service systems;

receiving by the one or more P2P service systems, one or more requests for repayment of a transaction from the financial service provider system;

identifying by the one or more P2P service systems, secondary user accounts of the one or more P2P service systems associated with secondary parties to the transaction based on the one or more requests for repayment received from the financial service provider system, wherein the secondary user accounts are accounts other than a cardholder of the card account used to pay for the transaction;

sending by the one or more P2P service systems, the one or more requests for repayment to the one or more secondary users of the one or more P2P service systems;

receiving by the one or more P2P service systems, repayment in response to the one or more requests for repayment sent from the one or more secondary users of the one or more P2P service systems; and sending, by the one or more P2P service systems, to the financial service provider system, repayment information regarding the repayments from the secondary users, the repayment information including a repayment act, a date of repayment, an amount of repayment, and an identification of at least one of the secondary users;

receiving by the financial service provider system, from the one or more P2P service systems, repayment information, regarding one or more repayments:

applying, by the financial service provider system, based on the repayment information, the one or more repayments to the transaction performed on the card.

14. The method of claim 13, wherein the first set of instructions further comprise: establishing a deep link between the financial service provider system and one or more P2P service systems.

15. The method of claim 13, wherein transaction information passed between the financial service provider system and the one or more P2P service systems is recorded on to a blockchain.

16. The method of claim 13, the first set of instructions further comprising:
  sending, to the one or more P2P service systems selected by the cardholder, authorization for payment,
  receiving full or partial funds from the P2P service system, and applying the received funds to a balance of the card.

* * * * *

UNITED STATES PATENT AND TRADEMARK OFFICE
CERTIFICATE OF CORRECTION

PATENT NO. : 11,062,292 B2  
APPLICATION NO. : 16/681776  
DATED : July 13, 2021  
INVENTOR(S) : Miller et al.

Page 1 of 1

It is certified that error appears in the above-identified patent and that said Letters Patent is hereby corrected as shown below:

In the Claims

Claim 1, Column 20, Line 63, "enrolling," should read as --enrolling--.

Claim 1, Column 20, Line 64, "receiving," should read as --receiving--.

Claim 1, Column 20, Line 66, "analyzing," should read as --analyzing--.

Claim 1, Column 21, Line 3, "sending," should read as --sending--.

Claim 1, Column 21, Line 8, "recording," should read as --recording--.

Claim 1, Column 21, Line 11, "querying," should read as --querying--.

Claim 1, Column 21, Line 14, "receiving," should read as --receiving--.

Claim 1, Column 21, Line 18, "confirming," should read as --confirming--.

Claim 1, Column 21, Line 20, "sending," should read as --sending--.

Claim 1, Column 21, Line 23, "information," should read as --information--.

Claim 4, Column 21, Line 65, "3," should read as --1,--.

Signed and Sealed this  
Twenty-fourth Day of August, 2021

Drew Hirshfeld  
*Performing the Functions and Duties of the*  
*Under Secretary of Commerce for Intellectual Property and*  
*Director of the United States Patent and Trademark Office*